(No Model.)
P. H. McWILLIAMS.
SHIFTING TRUCK.
No. 296,865. Patented Apr. 15, 1884.
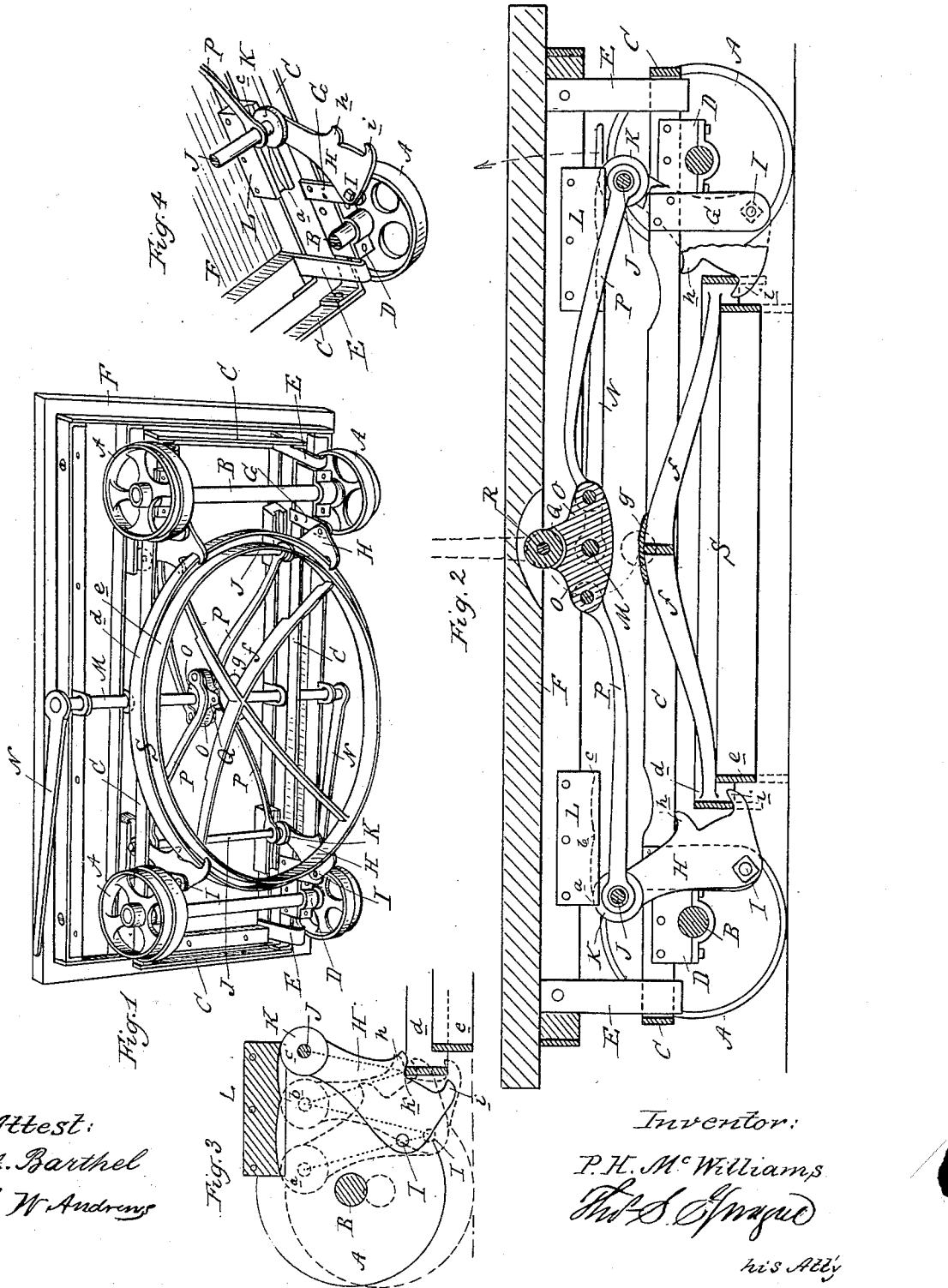
Attest:
A. Barthel
E. W. Andrews
Inventor:
P. H. McWilliams
Thos. S. Sprague
his Att'y
N. PETERS. Photo-Lithographer, Washington, D. C.

UNITED STATES PATENT OFFICE.

PATRICK H. McWILLIAMS, OF DETROIT, MICHIGAN.

SHIFTING-TRUCK.

SPECIFICATION forming part of Letters Patent No. 296,865, dated April 15, 1884.

Application filed October 16, 1883. (No model.)

*To all whom it may concern:*

Be it known that I, PATRICK H. MCWILLIAMS, of Detroit, in the county of Wayne and State of Michigan, have invented new and useful Improvements in Shifting-Trucks; and I do hereby declare that the following is a full, clear, and exact description thereof, reference being had to the accompanying drawings, which form a part of this specification.

This invention relates to an improvement in shifting-trucks of that class of trucks which obviate the necessity of turn-tables, transfer-tables, or their equivalents, to allow a truck to be run abruptly in a different direction.

The invention consists, first, in the combination of the truck with a turn-table, and devices for shifting the load from the wheels of the truck onto the turn-table, and vice versa, without raising or lowering the platform on which the load is carried; second, in the peculiar construction of the shifting devices, whereby the weight is transferred from the wheels of the truck onto the turn-table, or vice versa, without raising or lowering the platform on which the load is carried; third, in the peculiar construction and operation of the different parts, all as more fully hereinafter set forth.

In the accompanying drawings, which form a part of this specification, Figure 1 is a perspective view of my improved shifting-truck, looking at the under side thereof. Fig. 2 is a vertical cross-section. Fig. 3 is a diagram, illustrating the action of the shifting devices. Fig. 4 is a detached perspective view of one corner of my shifting-truck, showing the connection between the platform and the truck proper.

A are the wheels, upon which the truck is supported, which may be of any of the known forms suitable for the different styles of trucks, and which are intended for running either on rails or on the floor.

B are the axles upon which the wheels are secured.

C is a rectangular truck-frame, to which the axles B are journaled in suitable boxes, D.

E are vertical guides, secured to the under side of the platform F, holding the truck-frame C in engagement with the platform F, and allowing at the same time a vertical adjustability to the truck-frame. In the drawings, these guides E are shown to embrace the truck-frame C near the four corners thereof, whereby any side or end motion of the truck independent from the platform is prevented.

G are posts or hangers rigidly secured to the truck-frame, as shown in Fig. 4, or forming an integral part with the truck-frame.

H are shifting supports, one for each of the four posts G, to which they are pivotally secured at I.

J are two shafts, one connecting the upper ends of the two front supports, and the other connecting the upper ends of the rear supports, H.

K are friction-wheels journaled upon the shafts J.

L are bearing-plates secured to the under side of the platform F, and provided upon their under sides with the curved bearing-faces *a b c*, upon which the friction-wheels K are adapted to travel and support the platform.

M is a rock-shaft journaled transversely below the platform F, in the middle of the truck.

N are hand-levers, one of which is secured to each end of the rock-shaft M.

O are rocker-arms secured upon the rock-shaft M, near the center thereof.

P P are links pivotally secured at one end to the shafts J, and upon their other ends to the rock-arms O. Q is another rock-arm secured upon the rock-shaft M, and having secured upon its end a friction-roller, R. The three rock-arms, O O and Q, may radiate from a common hub, as shown in the drawings.

S is a turn-table, supported centrally below the platform, and between the truck-wheels. It is constructed and arranged as follows: *d e* are two concentric rings of different diameter. The ring *e*, which is the one with the smaller diameter, projects below the ring *d*, and both rings are held in their relative positions by being secured to spider-arms *f*, which are curved upwardly, and are provided at their junction with a bearing-plate, *g*.

The shifting supports H are provided upon their inner sides with lugs *h* and *i*, upon the lower ones of which the turn-table S is supported when not in use, as shown in Fig. 2.

In practice, with the levers N in the position shown in Fig. 2, the platform F, together with the load carried upon said platform, is supported upon the truck-wheels A, as the shifting supports H transmit the weight from the bearing-plates L, through the medium of the friction-rolls K, upon the pivots I, which latter form the connection between the truck-frame C and the shifting supports H. Now, if the lever N is actuated in the direction of the arrow shown in Fig. 2, the connections of the rock-shaft M with the shifting support H will cause the latter to oscillate around the pivotal point I, making the friction-wheels K travel upon the lower side of the bearing-plates L. This movement allows the turn-table S to drop until it touches the floor or the top of the rails upon which the truck is supported. This brings the levers N in a vertical position, or nearly so, as shown in Fig. 2, and if the movement of the lever N is now continued, the lugs $h$ will come in contact with the upper ends of the turn-table S, as shown in Fig. 3, in the middle position of the three positions shown there. As soon as the turn-table S touches the floor or the rails, the lugs $h$ will act as fulcrums for the shifting supports H during the further rotation of the levers N, and, transferring the load from the truck-frame upon the turn-table, will cause the pivots I to rise, which means, in other words, that the truck-frame with its axles and wheels is bodily raised some distance above the rails or floor, as the case may be. One-half of a revolution of the lever N completes this movement, and by bringing the friction-roller R in contact with the bearing-plate $g$, on top and in the center of the turn-table, the friction between the upper edge of the turn-table and the lug $h$ will thereby be sufficiently relieved to give to the whole truck a pivotal support upon the turn-table, allowing the truck to be easily shifted or turned around that point in any desired direction. After the truck is shifted, the levers N are brought back into their old position, causing a retrograde movement of the turn-table, which transfers the load from the turn-table upon the truck-frame in the reverse manner from that afore described.

The important point in the operation of my shifting-truck is the construction of the bearing-plates L, which are upon their lower sides provided with the curved bearing-faces $a\ b\ c$. The bearings $a\ b$ form segments of a circle, with the center at I, while the bearing-faces $b\ c$ are segments of circles, with the center at $k$, Fig. 3, this being the point where the lug $h$ begins to act as a fulcrum in the operation of the device. In Fig. 3 I show the shifting support H first in its initial position. During the first part of the oscillation of the levers N this support travels around the pivotal point I, and as the bearing-face $a\ b$ is a segment of a circle, with the center at I, it is clear that no portion of the load is either raised or lowered. As soon as the turn-table S has come in contact with the floor or the top of the rails, the lug $h$ has come in contact with the upper edge of the turn-table at the point $k$, and during the further rotation of the lever N the friction-wheels K will travel from $b$ to $c$. As this is a segment of a circle, with the center at $k$, it is clear that during this part of the travel the load is neither raised nor lowered, being simply shifted from the truck-frame onto said turn-table. To transfer the load from the circumference of the turn-table to its center, in order to free the truck sufficiently to shift it upon the central point of the turn-table, it is only necessary that the friction-roller R travel up a very slight incline formed by the bearing-plate $g$, on top of the turn-table S, which requires but very little power. Thus it will be seen that in the construction of my shifting-truck the load is undisturbed—that is to say, the fulcrum remains always at the same height above the floor; therefore all the power required by the operator is to overcome the friction of the different parts in the operation of the device, which, by means of the employment of friction-rollers, is reduced to a minimum.

What I claim as my invention is—

1. A shifting-truck composed of the following parts: a truck-frame connected with the platform by vertical guides, which allow the truck-frame to be raised or lowered vertically, shifting supports pivotally secured upon their lower ends to the truck-frame, and supporting the platform upon their upper ends, a circular turn-table supported by the shifting-supports and placed centrally between the truck-frame and below the platform, and mechanical devices for oscillating the shifting-supports, whereby the load may be transferred from the truck-frame onto the turn-table, and vice versa, substantially in the manner and for the purpose described.

2. In a shifting-truck, the combination of the shifting supports H, their actuating mechanism, and the turn-table S, with the lugs $i\ i$ of the shifting supports, substantially as and for the purposes described.

3. In a shifting-truck, the combination of the bearing-plates L, having segmental circular bearing-faces $a\ b\ c$, with the shifting supports H and their shifting-fulcrums I $k$, which form the respective centers of the bearing-faces $a\ b\ c$, substantially as and for the purposes described.

4. In a shifting-truck, the combination of the lever or levers N, rock shaft M, rock-arms O, links P, and shifting supports H, forming the devices by which the shifting supports are operated, and so arranged that they form a self-locking device, substantially as and for the purposes described.

5. In a shifting-truck, the combination of the turn-table S, provided with the central bearing-plate, $g$, with the rock-arm Q, bearing friction-roller R, substantially as and for the purpose described.

6. In a shifting-truck, the combination of the shifting supports H, and devices for operating the same simultaneously, the pivot I, and lug h, one forming a fulcrum upon which the load is supported by the truck, and the other forming a fulcrum by which the load is supported by the turn-table, substantially as and for the purpose described.

PATRICK H. McWILLIAMS.

Witnesses:
H. S. SPRAGUE,
E. W. ANDREWS.